(12) United States Patent
Miyamoto et al.

(10) Patent No.: US 9,058,085 B2
(45) Date of Patent: Jun. 16, 2015

(54) TOUCH SENSOR SYSTEM

(75) Inventors: Masayuki Miyamoto, Osaka (JP);
Shinichi Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/127,088

(22) PCT Filed: Apr. 4, 2012

(86) PCT No.: PCT/JP2012/059828
§ 371 (c)(1),
(2), (4) Date: Dec. 17, 2013

(87) PCT Pub. No.: WO2013/001889
PCT Pub. Date: Jan. 3, 2013

(65) Prior Publication Data
US 2014/0139482 A1    May 22, 2014

(30) Foreign Application Priority Data
Jun. 27, 2011   (JP) .................. 2011-142163

(51) Int. Cl.
*G06F 3/044*   (2006.01)
*G06F 3/041*   (2006.01)
*G06F 3/0488*  (2013.01)

(52) U.S. Cl.
CPC .............. *G06F 3/044* (2013.01); *G06F 3/0488* (2013.01); *G06F 3/0416* (2013.01); *G06F 2203/04106* (2013.01)

(58) Field of Classification Search
CPC ..... G06F 3/044; G06F 3/0416; G06F 3/0488; G06F 2203/04106
USPC .................... 345/173–179; 178/18.01–18.09
See application file for complete search history.

(56) References Cited

U.S. PATENT DOCUMENTS

| 7,812,828 | B2 | 10/2010 | Westerman et al. |
| 8,278,571 | B2 | 10/2012 | Orsley |
| 8,330,733 | B2 | 12/2012 | Petschnigg et al. |
| 8,493,359 | B2 | 7/2013 | Wright et al. |

(Continued)

FOREIGN PATENT DOCUMENTS

| JP | 6-67788 A | 3/1994 |
| JP | 9-44293 A | 2/1997 |

(Continued)

OTHER PUBLICATIONS

Quayle Action for related U.S. Appl. No. 14/127,391 mailed May 14, 2014.

(Continued)

*Primary Examiner* — Premal Patel
(74) *Attorney, Agent, or Firm* — Birch, Stewart, Kolasch & Birch, LLP

(57) ABSTRACT

The touch sensor system (1) includes: a touch panel (2) having a two-dimensional region (12) made up of a hand placing region (13) and a remainder region (14); a hand placing region processing section (3) for carrying out a process related to the hand placing region in accordance with a hand placing region touch signal corresponding to a touch to the hand placing region (13); and a plot input processing section (4) for carrying out a plot input process in accordance with a remainder region touch signal corresponding to a touch to the remainder region (14).

8 Claims, 4 Drawing Sheets

(56) References Cited

U.S. PATENT DOCUMENTS

| | | |
|---|---|---|
| 2003/0080946 A1 | 5/2003 | Chuang |
| 2005/0073324 A1 | 4/2005 | Umeda et al. |
| 2005/0141263 A1 | 6/2005 | Umeda et al. |
| 2005/0156912 A1 | 7/2005 | Taylor et al. |
| 2006/0017709 A1* | 1/2006 | Okano .................... 345/173 |
| 2006/0158202 A1 | 7/2006 | Umeda et al. |
| 2007/0152976 A1 | 7/2007 | Townsend et al. |
| 2008/0006453 A1* | 1/2008 | Hotelling .................. 178/18.06 |
| 2010/0026655 A1 | 2/2010 | Harley |
| 2010/0085324 A1 | 4/2010 | Noguchi et al. |
| 2010/0085325 A1 | 4/2010 | King-Smith et al. |
| 2010/0182247 A1* | 7/2010 | Petschnigg et al. .......... 345/173 |
| 2011/0012855 A1 | 1/2011 | Yeh et al. |
| 2011/0043478 A1 | 2/2011 | Matsushima |
| 2011/0279391 A1 | 11/2011 | Nakai et al. |

FOREIGN PATENT DOCUMENTS

| | | |
|---|---|---|
| JP | 2001-125744 A | 5/2001 |
| JP | 2001-222376 A | 8/2001 |
| JP | 2005-114362 A | 4/2005 |
| JP | 2005-134240 A | 5/2005 |
| JP | 4364609 B2 | 11/2009 |
| JP | 4387773 B2 | 12/2009 |
| JP | 2010-92275 A | 4/2010 |
| WO | WO 2009/107415 A1 | 9/2009 |
| WO | WO 2010/090033 A1 | 8/2010 |

OTHER PUBLICATIONS

US Office Action issued Apr. 2, 2015 for related U.S. Appl. No. 14/129,061.

Extended European Search Report issued Feb. 26, 2015 in the corresponding European Patent Application No. 12804146.4.

\* cited by examiner

TOUCH SENSOR SYSTEM

TECHNICAL FIELD

The present invention relates to a touch sensor system configured to detect a touch signal that is based on a touch to a touch panel.

BACKGROUND ART

As shown in Patent Literature 1, a conventional touch sensor system configured to detect how capacitance values are distributed has been trying to carry out recognition of a finger and part of a hand which are in contact with a touch panel by means of signal processing. For example, assume that a hand holding a stylus is in contact with a touch panel. A signal based on how the touch panel is touched significantly changes over time according to action of moving the stylus etc.

(a) to (d) of FIG. 5 are views for describing touch signals observed when a hand is placed on a touch panel. As shown in (a) of FIG. 5, a region where the hand is placed on the touch panel is small at first, i.e., the region is a region 16a. Then, as shown in (b) of FIG. 5, the region where the hand is placed on the touch panel expands over time to a region 16b. Next, as shown in (c) of FIG. 5, the region where the hand is placed on the touch panel further expands over time, and a tip of a stylus held in the hand makes contact with the touch panel. This causes a stylus input region 18 to appear. After that, as shown in (d) of FIG. 5, the region where the hand is in contact with the touch panel changes from the region 16c to a region 16d, and a region 17 where a finger is in contact with the touch panel appears.

CITATION LIST

Patent Literature

Patent Literature 1
Specification of U.S. Pat. No. 7,812,828 (Oct. 12, 2010)

SUMMARY OF INVENTION

Technical Problem

However, it is difficult to accurately distinguish among the signals from the regions that appear and change as shown in (a) to (d) of FIG. 5. That is, it is difficult to accurately distinguish among a signal based on an input with a stylus, a signal generated in response to a hand being placed on a touch panel, and a signal generated in response to a finger making contact with the touch panel. This causes a problem in which a signal based on an input with a stylus, a signal generated in response to a hand being placed on the touch panel and a signal generated in response to a finger making contact with the touch panel may be recognized falsely.

An object of the present invention is to provide a touch sensor system that does not falsely recognize a signal based on an input with a stylus.

Solution to Problem

A touch sensor system in accordance with the present invention includes: a touch panel having a two-dimensional region made up of at least one partial region and a remainder region that is other than said at least one partial region; first processing means for carrying out a first process in accordance with a partial region touch signal corresponding to a touch to said at least one partial region; and second processing means for carrying out a second process in accordance with a remainder region touch signal corresponding to a touch to the remainder region, the second, process being different in kind from the first process.

According to this feature, the first process is carried out in accordance with the partial region touch signal corresponding to a touch to the partial region, and the second process that is different in kind from the first process is carried out in accordance with the remainder region touch signal corresponding to a touch to the remainder region. This makes it possible to carry out processes in which (i) a signal based on an unintended touch input with respect to the partial region and (ii) a signal based on an intended touch input with respect to the remainder region are dealt with separately from each other. As a result, it is possible to provide a touch sensor system that does not falsely recognize a signal based on an unintended touch input with respect to the partial region as a signal based on an intended input with a stylus with respect to the remainder region.

Advantageous Effects of Invention

A touch sensor system in accordance with the present invention includes: first processing means for carrying out a first process in accordance with a partial region touch signal corresponding to a touch to the at least partial region; and second processing means for carrying out a second process in accordance with a remainder region touch signal corresponding to a touch to the remainder region, the second process being different in kind from the first process. This makes it possible to carry out processes in which (i) a signal based on an unintended touch input with respect to the partial region and (ii) a signal based on an intended touch input with respect to the remainder region are dealt with separately from each other. As a result, it is possible to provide a touch sensor system that does not falsely recognize a signal based on an unintended touch input with respect to the partial region as a signal based on an intended input with a stylus with respect to the remainder region.

BRIEF DESCRIPTION OF DRAWINGS

FIG. 1 is a view schematically showing a configuration of a touch sensor system in accordance with an embodiment.

FIG. 2 is a view showing a hand placing region that is set on a touch panel of the touch sensor system.

Figure 3:
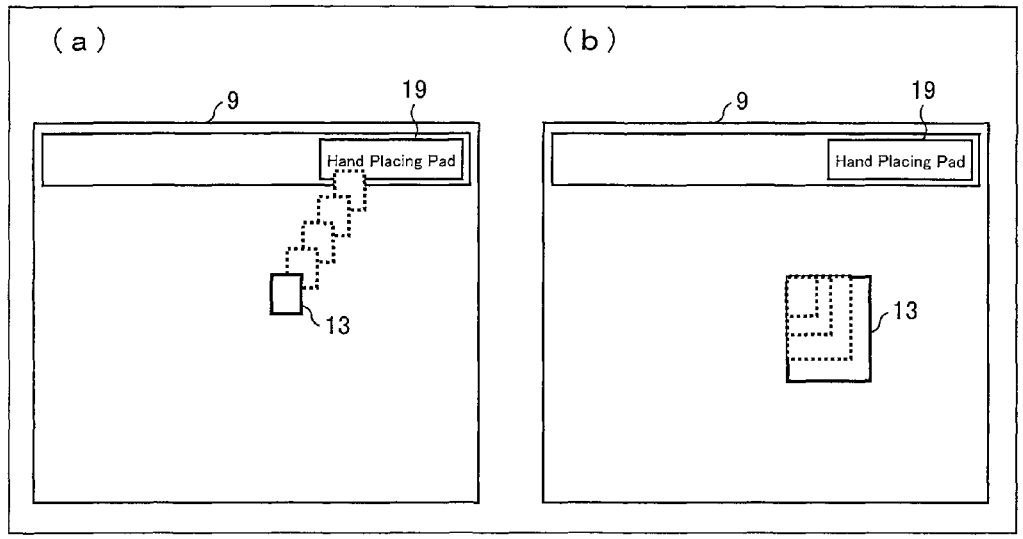
FIG. 3

(a) and (b) of FIG. 3 are views each showing an example of how the hand placing region is set by a user.

FIG. 4

Figure 4:
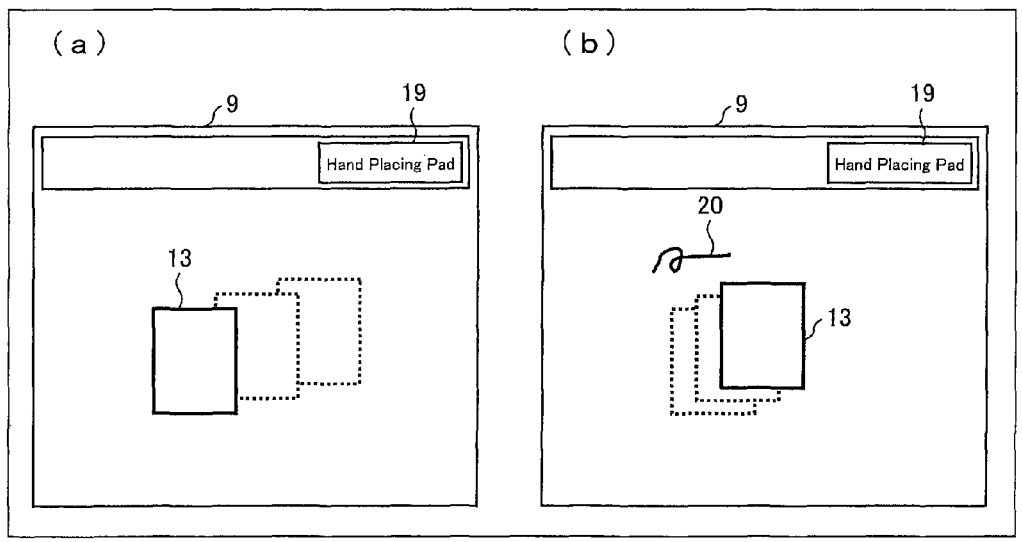

(a) and (b) of FIG. 4 are views each showing an example of how the hand placing region is set by a user.

FIG. 5

Figure 5:
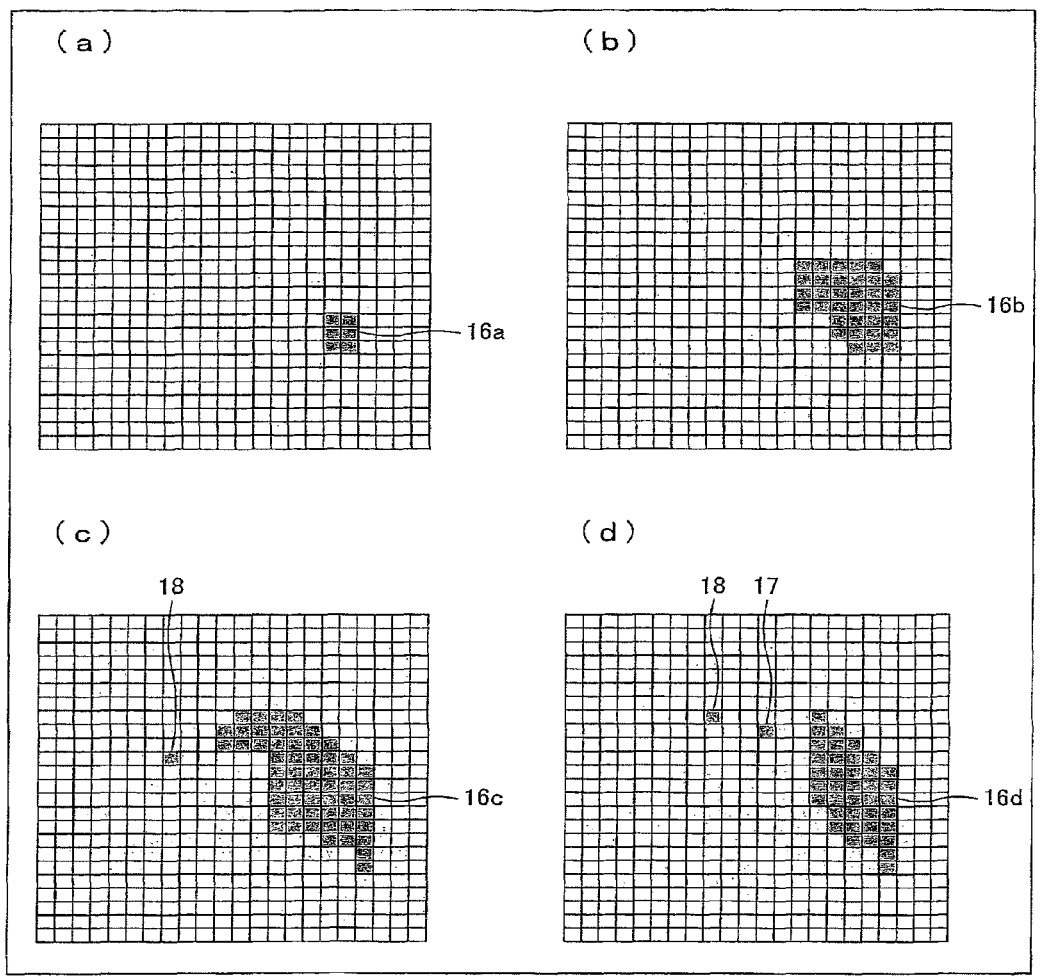

(a) to (d) of FIG. 5 are views for describing touch signals observed when a hand is placed on a touch panel.

DESCRIPTION OF EMBODIMENTS

The following description discusses, with reference to FIGS. 1 to 4, an embodiment of a touch sensor system of the present invention.

(Configuration of Touch Sensor System)

Figure 1:
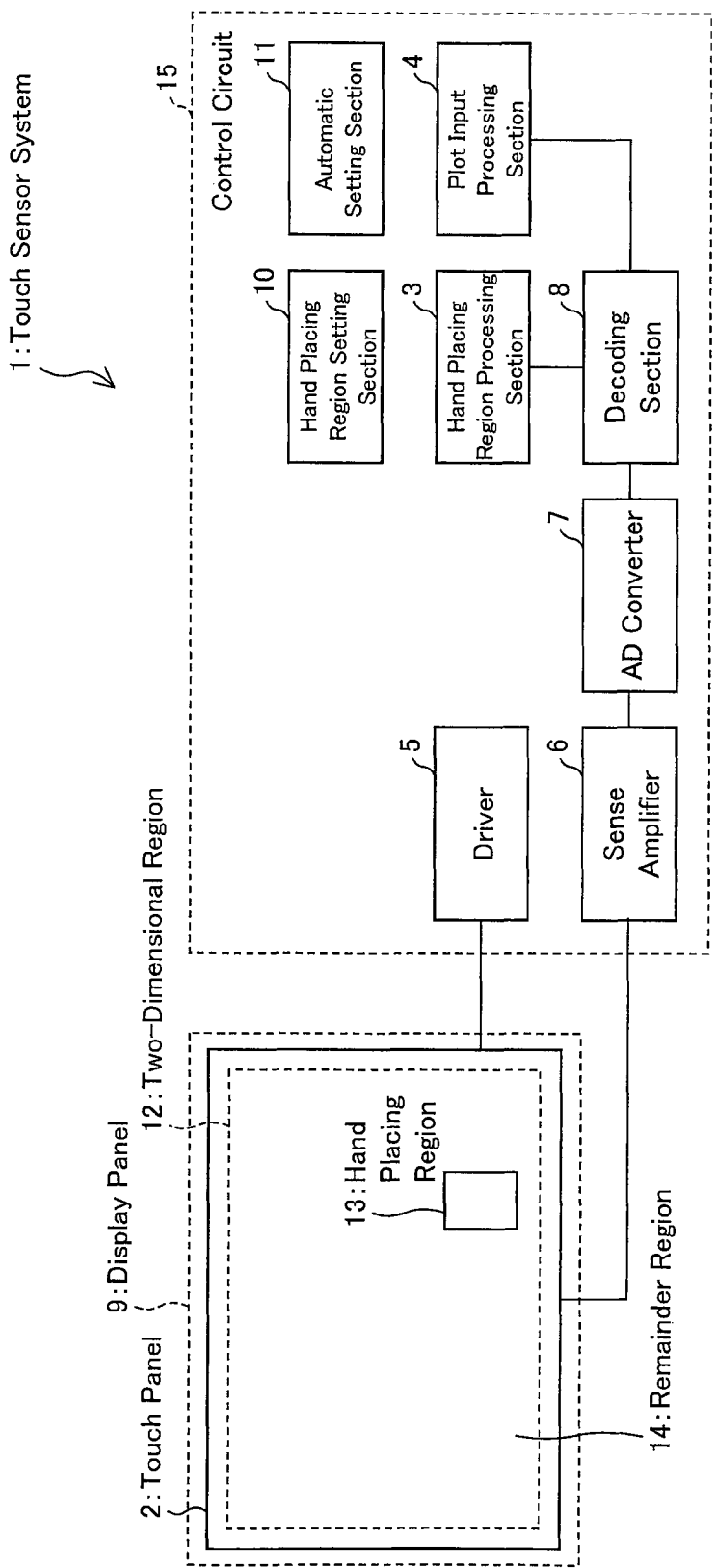
FIG. 1

FIG. 1 is a view schematically showing a configuration of a touch sensor system 1 in accordance with an embodiment. The touch sensor system 1 includes a touch panel 2. The touch panel 2 is provided so as to be stacked on a display panel 9. The touch panel 2 is for example a large touch panel, which is approximately 80 inches in size and is capable of being placed on a surface of a board of an electronic blackboard system. The touch panel 2 may be contained in the display panel 9.

The touch panel 2 has on its surface a two-dimensional region 12. The two-dimensional region 12 is made up of (i) a hand placing region (partial region) (also referred to as a hand placing pad) 13 that is rectangle in shape and (ii) a remainder region 14 that is other than the hand placing region 13.

Figure 2:
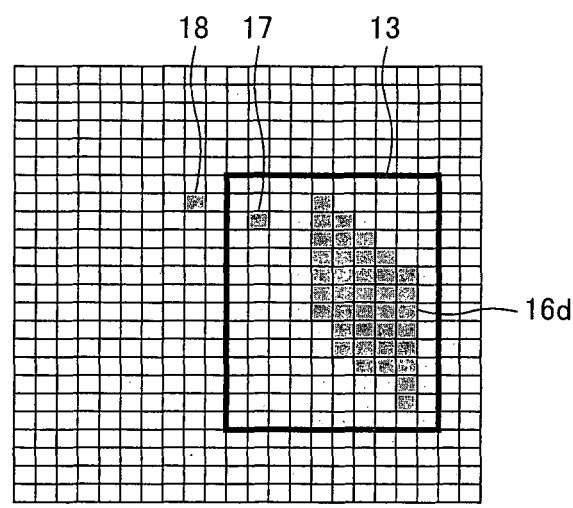
FIG. 2

FIG. 2 is a view showing the hand placing region 13 which is set on the touch panel 2. The hand placing region 13 is rectangle in shape, and is set (i) so as to include a region 16d of a hand that is placed on the touch panel 2 and a region 17 where a finger is in contact with the touch panel 2 and (ii) such that a stylus input region 18 where a tip of a stylus held in the hand is in contact with the touch panel 2 is located outside the hand placing region 13. As described above, the hand placing region 13 is configured so as to include the region 16d where a hand holding an input stylus is placed.

The touch panel 2 includes a plurality of drive lines (not illustrated) arranged horizontally and in parallel with each other, a plurality of sense lines (not illustrated) arranged vertically and in parallel with each other, and a plurality of capacitances (not illustrated) formed at respective intersections of the plurality of drive lines and the plurality of sense lines.

The touch sensor system 1 includes a control circuit 15. The control circuit 15 has a driver 5 and a sense amplifier 6. The driver 5 applies voltages to drive the plurality of drive lines, thereby supplying charges to the capacitances. The sense amplifier 6 reads out a linear sum of charges stored in the capacitances from each of the sense lines, and supplies the linear sum to an AD converter 7.

The AD converter 7 converts, from analogue to digital, the linear sum of the charges stored in the capacitances, and supplies it to a decoding section 8. The decoding section 8 (i) decodes the linear sum of the charges supplied from the AD converter 7 to find how capacitances are distributed, (ii) generates a hand placing region touch signal (partial region touch signal) corresponding to a touch to the hand placing region 13 of the two-dimensional region 12 of the touch panel 2 and then supplies the hand placing region touch signal to a hand placing region processing section 3 (first processing means), and (iii) generates a plot signal (remainder region touch signal) corresponding to a touch to the remainder region 14 and then supplies the plot signal to a plot input processing section 4 (second processing means). The plot signal is typically a signal for input of a character being plotted.

The plot input processing section 4 carries out, in accordance with the plot signal supplied from the decoding section 8, a process based on a plot input with respect to the remainder region 14 of the two-dimensional region 12.

The hand placing region processing section 3 carries out, in accordance with the hand placing region touch signal supplied from the decoding section 8, a process related to movement of the hand placing region 13 or a change in size of the hand placing region 13.

With such a configuration in which the hand placing region 13 where a touch with a hand to the touch panel 2 is not regarded as a stylus input signal (plot signal) is set so that only a signal generated by a touch to the remainder region 14 that is other than the hand placing region 13 is regarded as a stylus input signal, it is possible to prevent a signal based on an unintended touch input with respect to the hand placing region 13 from being falsely recognized as a signal based on an intended input with a stylus with respect to the remainder region 14.

(How to Set Hand Placing Region)

(a) and (b) of FIG. 3 and (a) and (b) of FIG. 4 are views showing an example of how the hand placing region 13 is set by a user. The control circuit 15 includes a hand placing region setting section 10.

As shown in (a) of FIG. 3, a user touches with a finger a hand placing pad menu 19 on an application screen displayed on the display panel 9, and moves the finger to the center of the screen. In response to this, the hand placing region setting section 10 gives, to the hand placing region processing section 3, an instruction to move a display position of the hand placing region 13 to the center of the screen. Then, when the user touches a corner of the hand placing region 13 thus moved to the center of the screen, the hand placing region setting section 10 gives, to the hand placing region processing section 3, an instruction to change the size of the hand placing region 13 according to how the corner is touched (refer to (b) of FIG. 3). Further, when the user touches the center of the hand placing region 13 displayed on the display panel 9 and moves the finger while keeping the finger in contact with the display panel 9, the hand placing region setting section 10 gives, to the hand placing region processing section 3, an instruction to change the display position of the hand placing region 13 according to the movement of the finger (refer to (a) of FIG. 4).

As described above, it is possible to set the hand placing region 13 from a menu of application displayed on the display panel 9 by a touch operation, and further possible to change the position and the size of the hand placing region 13 by a touch operation.

For easy handwriting input with use of a stylus, the hand placing region setting section 10 may give, to the hand placing region processing section 3, an instruction to move the hand placing region 13 so that the hand placing region 13 follows movement of a hand that holds a stylus corresponding to a stylus input trail 20 and is placed on the touch panel (see (b) of FIG. 4). This can be achieved by for example (i) finding a center of mass of the region 16d (FIG. 2) which is in the hand placing region 13 and in which a touch signal is generated and (ii) moving the hand placing region 13 so that the hand placing region 13 follows movement of the center of mass.

Further, the control circuit 15 may include an automatic setting section (automatic setting means) 11 for automatically setting the position and the size of the hand placing region 13 in accordance with the hand placing region touch signal and the plot signal.

It is also possible to employ a configuration in which a plurality of hand placing regions 13 are set. This is because a large-screen touch sensor system would receive inputs with styluses from a plurality of users.

In the present embodiment, a capacitive touch sensor system is discussed as an example. Note, however, that the present invention is not limited to this, and is applicable also to a touch sensor system other than the capacitive touch sensor system. For example, the present invention is applicable to an electromagnetic induction touch sensor system.

Further, although the hand placing region 13 rectangle in shape is discussed as an example, the present invention is not limited to this. The hand placing region 13 may have a shape other than a rectangle, for example a circle, an ellipse or a triangle.

Further, a menu selection processing section and an icon movement processing section may be provided as the second processing means recited in claims, in addition to the plot input processing section 4. The menu selection processing section processes a touch signal for selecting a menu displayed in the remainder region 14, and the icon movement processing section processes a touch signal for moving an icon displayed in the remainder region 14. Further, a blackboard eraser region may be provided in the two-dimensional region 12 of the touch panel 2 as the partial region recited in claims instead of or in addition to the hand placing region 13, and a blackboard eraser processing section may be provided as the first processing means recited in claims. The blackboard eraser region serves as a blackboard eraser (or an eraser), and the blackboard eraser processing section carries out a function of the blackboard eraser region as a blackboard eraser in accordance with a signal from the blackboard eraser region.

A signal (remainder region touch signal) corresponding to a touch to the remainder region 14 includes (i) a plot signal generated with use of a stylus and/or (ii) a touch signal generated with a finger. The plot signal generated with use of a stylus includes: a signal generated in response to an operation to plot a character on the remainder region 14 with use of a stylus; a signal generated in response to an operation to select, with use of a stylus, a menu displayed on the remainder region 14; and a signal generated in response to an operation to select or move, with use of a stylus, an icon displayed on the remainder region 14. The touch signal generated with a finger includes: a signal generated in response to an operation to plot a character on the remainder region 14 with a finger; a signal generated in response to an operation to select, with a finger, a menu displayed on the remainder region 14; and a signal generated in response to an operation to select or move, with a finger, an icon displayed on the remainder region 14.

The touch sensor system in accordance with the present embodiment is preferably configured such that: said at least one partial region is a hand placing region that includes a region where a hand is placed for input to the touch panel; the partial region touch signal is a hand placing region touch signal corresponding to a touch to the hand placing region; the remainder region touch signal includes (i) a plot signal generated by a stylus and/or (ii) a touch signal generated by a finger; the first processing means carries out, in accordance with the hand placing region touch signal, a process related to movement of the hand placing region or to a change in size of the hand placing region; and the second processing means carries out, in accordance with the remainder region touch signal, a process based on (a) a plot input with respect to the two-dimensional region and/or (b) a touch input with respect to the two-dimensional region.

The configuration makes it possible to carry out processes in which (i) an unintended touch signal generated by a hand that holds a stylus and is placed on the touch panel and (ii) an intended touch signal based on plotting with respect to the touch panel are dealt with separately from each other.

The touch sensor system in accordance with the present embodiment is preferably configured such that the touch panel has: two-dimensionally distributed capacitances; and a plurality of said hand placing regions.

The configuration causes the present invention to be applicable to a touch sensor system including a large-screen touch panel.

The touch sensor system in accordance with the present embodiment is preferably configured such that the hand placing region moves within the two-dimensional region according to movement of the hand.

The configuration makes it possible to carry out processes in which (i) an unintended touch signal generated by a hand that holds a stylus and is placed on the touch panel at any position in the two-dimensional region and (ii) an intended touch signal based on plotting with respect to the touch panel are dealt with separately from each other.

The touch sensor system in accordance with the present embodiment is preferably configured such that the hand placing region is rectangle in shape.

The configuration makes it possible to easily configure the hand placing region.

It is preferable that a touch sensor system in accordance with the present embodiment further include: a display panel which is provided so as to be stacked on the touch panel or in which the touch panel is contained; and hand placing region setting means for setting the hand placing region on a screen that is displayed on the display panel.

The configuration makes it possible to easily set the hand placing region.

It is preferable that a touch sensor system in accordance with the present embodiment further include automatic setting means for automatically setting the hand placing region in accordance with a touch to the two-dimensional region.

The configuration makes it possible to more easily set the hand placing region.

The present invention is not limited to the descriptions of the respective embodiments, but may be altered within the scope of the claims. An embodiment derived from a proper combination of technical means disclosed in different embodiments is encompassed in the technical scope of the invention.

Industrial Applicability

The present invention is usable in a touch sensor system configured to detect a touch signal that is based on a touch to a touch panel. Further, the present invention is applicable to an electronic blackboard system.

REFERENCE SIGNS LIST

1 Touch sensor system
2 Touch panel
3 Hand placing region processing section (first processing means)
4 Plot input processing section (second processing means)
5 Driver
6 Sense amplifier
7 AD converter
8 Decoding section
9 Display panel
10 Hand placing region setting section (hand placing region setting means)
11 Automatic setting section (automatic setting means)
12 Two-dimensional region
13 Hand placing region (partial region)
14 Remainder region
15 Control circuit
16a to 16d Region
17 Region
18 Stylus input region
19 Pad menu
20 Stylus input trail

The invention claimed is:
1. A touch sensor system comprising:
a touch panel having a two-dimensional region made up of at least one partial region and a remainder region that is other than said at least one partial region; and
a control circuit carrying out a first process in accordance with a partial region touch signal corresponding to a touch to said at least one partial region; and carrying out a second process in accordance with a remainder region touch signal corresponding to a touch to the remainder region, the second process being different in kind from the first process, said at least one partial region being a hand placing region within which a hand is to be placed for input to the touch panel, the partial region touch signal being a hand placing region touch signal corresponding to a touch within the hand placing region, the remainder region touch signal including (i) a plot signal generated by a stylus and/or (ii) a touch signal generated by a finger, the control circuit carrying out, in accordance with movement on the touch panel of the hand placing region touch signal, the first process of moving a position of the hand placing region or a process of changing size of the hand placing region, the process of moving a position of the hand placing region including generating the hand placing region touch signal based on a region where the hand is placed, determining a center of mass of a region where the hand is being placed during input to the touch panel using the hand placing region touch signal, and moving the hand placing region such that the hand placing region follows movement of the center of mass, the control circuit carrying out, in accordance with the remainder region touch signal, the second process based on (a) a plot input with respect to the two-dimensional region and/or (b) a touch input with respect to the two-dimensional region.

2. The touch sensor system according to claim 1, wherein the touch panel has:
two-dimensionally distributed capacitances; and
a plurality of said hand placing regions.

3. The touch sensor system according to claim 1, wherein the hand placing region is rectangle in shape, and wherein the region where the hand is placed during input to the touch panel is within the rectangle and is smaller than the hand placing region.

4. The touch sensor system according to claim 1, wherein:
the touch panel is stacked on a display panel is contained in the display panel; and
said control circuit further setting the hand placing region on a screen that is displayed on the display panel.

5. The touch sensor system according to claim 1, said control circuit further setting the hand placing region in accordance with a touch to the two-dimensional region.

6. The touch sensor system according to claim 1, wherein:
the touch panel is stacked on a display panel and is contained in the display panel; and while not performing the second process and without input of the remainder region touch signal, said control circuit carrying out, in accordance with the movement of the hand placing region touch signal, a process of moving a display position of the hand placing region or changing size of the hand placing region as displayed by the display panel.

7. A method for a touch sensor system that comprises
a touch panel having a two-dimensional region made up of at least one partial region and a remainder region that is other than said at least one partial region; and
a control circuit,
said at least one partial region being a hand placing region within which a hand is to be placed for input to the touch panel,
a partial region touch signal being a hand placing region touch signal corresponding to a touch within the hand placing region,
a remainder region touch signal including (i) a plot signal generated by a stylus and/or (ii) a touch signal generated by a finger,
the method, being performed by the control circuit, comprises:
carrying out a first process in accordance with the partial region touch signal corresponding to a touch to said at least one partial region;
carrying out a second process in accordance with the remainder region touch signal corresponding to a touch to the remainder region, the second process being different in kind from the first process;
carrying out, in accordance with movement on the touch panel of the hand placing region touch signal, the first process of moving a position of the hand placing region or a process of changing size of the hand placing region, the process of moving a position of the hand placing region including generating the hand placing region touch signal based on a region where the hand is placed, determining a center of mass of a region where the hand is being placed during input to the touch panel using the hand placing region touch signal, and moving the hand placing region such that the hand placing region follows movement of the center of mass; and
carrying out, in accordance with the remainder region touch signal, the second process based on (a) a plot input with respect to the two-dimensional region and/or (b) a touch input with respect to the two-dimensional region.

8. The method according to claim 7, wherein:
while not performing the second process and without input of the remainder region touch signal, carrying out, in accordance with the movement of the hand placing region touch signal, a process of moving a display position of the hand placing region or changing size of the hand placing region as displayed.

* * * * *